3,345,364
BENZIMIDAZOLINYL PIPERIDINES
Paul Adriaan Jan Janssen, Vosselaar, near Turnhout, Belgium, assignor to Janssen Pharmaceutica N.V., a corporation of Belgium
No Drawing. Filed May 6, 1964, Ser. No. 365,501
7 Claims. (Cl. 260—240)

This invention relates to a new series of organic compounds. More particularly, it concerns certain benzimidazolinyl piperidines and the therapeutically active nontoxic acid addition salts thereof.

The novel compounds of this invention may be represented by the following formula:

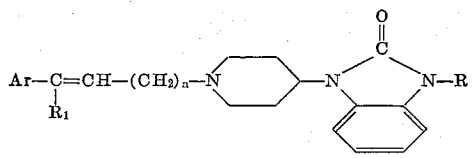

wherein R is selected from the group consisting of hydrogen, lower alkyl, lower alkyl-carbonyl, benzoyl, hydroxymethyl, halomethyl, lower alkoxymethyl, cyanomethyl and cyano-$CH(R_2)CH(R_2)$—, said $R_2$ being a member selected from the group consisting of hydrogen and methyl; $R_1$ is selected from the group consisting of hydrogen and methyl; and $n$ is an integer from 1 to 2.

In the above formula, Ar represents an aryl radical selected from the group consisting of phenyl; halophenyl, preferably chlorophenyl and fluorophenyl; lower alkylphenyl, preferably methylphenyl; and lower alkoxyphenyl, preferably methoxyphenyl.

As used herein, lower alkyl and lower alkoxy have from 1 to 5 carbon atoms, such as, for example, methyl, ethyl, propyl, isopropyl, butyl, isobutyl, tertiary-butyl, pentyl and the like, and the respective methoxy, ethoxy, propoxy, isopropoxy, butoxy, etc.

Depending upon the conditions employed during the course of the reaction, the novel compounds of this invention are obtained either in the form of the free bases or salts thereof. The salts are converted to the free bases in the usual manner, e.g., by reaction with alkali such as sodium or potassium hydroxide. The compounds in base form may be converted to their therapeutically useful acid addition salts by reaction with an appropriate acid as, for example, an inorganic acid such as a hydrohalic acid, i.e. hydrochloric, hydrobromic or hydriodic acid; sulfuric, nitric or thiocyanic acid; a phosphoric acid; an organic acid such as acetic, propionic, glycolic, lactic, pyruvic, oxalic, malonic, succinic, maleic, fumaric, malic, tartaric, citric, benzoic, cinnamic, mandelic, methanesulfonic, ethanesulfonic, hydroxyethanesulfonic, p-toluenesulfonic, salicylic, p-aminosalicyclic, 2-phenoxy-benzoic or 2-acetoxy benzoic acid.

The compounds of this invention have useful pharmacological properties. They show activity as central nervous system depressants and are particularly useful as neuroleptic agents possessing such characteristics as apomorphine-antagonist and ampethamine-antagonist activity, and the inhibition of the licking reflex and of the righting reflex in treated mice, whereas they are devoid of mydriatic activity at high non-toxic dose levels.

The compounds of this invention, particularly those wherein R is other than lower alkyl-carbonyl, may be obtained by reacting a compound of the formula,

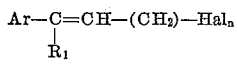

wherein Hal stands for chloro or bromo, and each of $R_1$, Ar and $n$ is as previously defined, with the appropriate 4-(2-oxo-1-benzimidazolinyl)-piperidine in an inert organic solvent under, preferably, reflux conditions and in the pesence of a halogen acid acceptor, for example, sodium carbonate and organic tertiary amines such as the trialkylamines, e.g., triethyl amine, tributyl amine, etc.; heterocyclic amines, e.g., N-alkyl piperidine, N-alkyl morpholine, pyridine, quinoline, etc.; and dialkyl aromatic amines, e.g., diethyl aniline, dimethyl aniline, etc., to bind the halogen acid that is liberated during the course of the reaction. The amount of halogen acid acceptor that may be employed is not critical, but, for optimum conditions, the theoretical number of moles of halogen acid liberated during the course of the reaction can easily be calculated from the quantities of reactants employed and, thus, the corresponding amount of halogen acid acceptor that need be employed can readily be determined. Among the organic solvents that are operable herein are aromatic hydrocarbons such as toluene, benzene, xylene and the like; lower aliphatic alcohols such as methanol, ethanol and the like; and aliphatic ketones such as acetone, butanone, 4-methyl-2-pentanone and the like.

Introduction of a hydroxymethyl group at the 3-position of the benzimidazolinone moiety may be effected by treatment of the desired benzimidazolinone of this invention wherein R is hydrogen, i.e., the 3-position on the benzimidazolyl function is unsubstituted, with formaldehyde, under reflux conditions in the presence of a suitable water-organic solvent, e.g., an aqueous solution of formaldehyde and methanol, ethanol, isopropanol, dioxane, benzene, toluene, etc.

The compounds of this invention, wherein R is lower alkyl-carbonyl, may be prepared by acylation of the corresponding benzimidazolinone which is unsubstituted in the 3-position, i.e., where R is hydrogen. The reaction may be carried out by heating such unsubstituted benzimidazolinones, preferably under reflux conditions, with an appropriate acylating agent such as the anhydride of a lower aliphatic acid, e.g., acetic anhydride, propionic anhydride, n-butyric anhydride, isobutyric anhydride, valeric anhydride, caproic anhydride and the like. Lower carboxylic acid halogenides may also be used advantageously as the acylating agent, e.g., acetyl chloride, butyryl chloride, isobutyryl chloride, valeryl chloride and the like. The acylation reaction may be carried out in a variety of anhydrous nonhydroxylic solvents such as benzene, toluene, chloroform, methylene chloride, tetrahydrofuran, diethyl-ether, etc.

Introduction of a lower alkyl group in the 3-position of the benzimidazolinyl moiety is accomplished by treatment of the corresponding 3-unsubstituted benzimidazolinone with the appropriate alkylating agent, such as a lower alkyl halide or, if a methyl group is desired, a phenyltrimethylammonium halide, such as the bromide, iodide or chloride, in the presence of a strong base, e.g., sodium amide, under reflux conditions in a suitable inert organic solvent such as the aromatic hydrocarbons, e.g., benzene, toluene, xylene and the like.

Replacement of the hydroxy function in the 3-(hydroxymethyl)-substituted benzimidazolinyl moiety with a halogen is suitably effected by treatment with a sulfur or phosphorous oxyhalide as, for example, phosphorous-oxychloride, or, preferably, thionyl chloride, at temperatures generally at or below room temperature to yield the corresponding 3-(halomethyl)-substituted benzimidazolinyl piperidines of this invention. Furthermore, treatment of the resulting halogenated derivative with the appropriate alkali earth metal or alkali metal salt of a lower alkanol in the presence of a solvent suitable for such alkoxide, e.g., a lower alkanol, under reflux conditions, causes formation of the appropriate ether function, i.e., a lower alkoxy-methyl group then resides in the 3-position of the benzimidazolinyl moiety.

Cyano-CH($R_2$)CH($R_2$)-groups, in which each $R_2$ stands for hydrogen or methyl, may be introduced into the 3-position of the benzimidazolinone moiety by treating the corresponding 3-unsubstituted benzimidazolinone with the appropriate α-β-unsaturated nitrile, i.e., acrylonitrile, α-methyl acrylonitrile, crotononitrile or 2-methyl-2-butene-nitrile in a suitable inert organic solvent, e.g., anhydrous tetrahydrofuran, 1,4-dioxane, etc., in the presence of a strong base such as sodium alkoxide or a quaternary ammonium hydroxide, e.g., trimethylbenzylammonium hydroxide or triethylbenzylammonium hydroxide. The 3-(cyanomethyl)-substituted benzimidazolinyl piperidines of this invention may be prepared by treatment of the corresponding 3-(halomethyl)-substituted benzimidazolinyl piperidine with an alkali cyanide, e.g., potassium cyanide, thereby effecting replacement of the halo group with a cyano group.

Introduction of the benzoyl group in the 3-position is accomplished by acylation of the corresponding 3-unsubstituted benzimidazolinone with benzoyl chloride. This may be effected by treatment of the 3-unsubstituted benzimidazolinone with a strongly basic non-hydroxylic agent such as an alkali metal hydride, e.g., sodium hydride, lithium hydride and the like, to form the corresponding alkali metal salt and then treating said salt with benzoyl chloride in an anhydrous organic solvent. Among such anhydrous organic solvents are the dialkylformamides, e.g., dimethylformamide, diethylformamide and the like, aromatic hydrocarbons, e.g., benzene, toluene, xylene, chlorobenzene, nitrobenzene and the like, mixtures of said dialkylformamides and said aromatic hydrocarbons, tetrahydrofuran, tert.-butanol and 1,2-dimethoxyethane. Other strong bases that may advantageously be utilized in lieu of the preferred alkali metal hydrides mentioned above are alkali metal amides such as sodamide, lithamide and the like, and alkali metal tertiary alkoxides such as sodium tertiary butoxide, potassium, tertiary butoxide and the like.

The following examples are intended to illustrate, and not to limit, the scope of the present invention.

*Example I*

A mixture of 4.3 parts cinnamylchloride, 5 parts 4-(2-oxo-1-benzimidazolinyl)-piperidine, 7.5 parts sodium carbonate, a few crystals of potassium iodide in 160 parts 4-methyl-2-pentanone is stirred and refluxed for 60 hours. After cooling, the reaction mixture is filtered and evaporated. The residue is dissolved in diisopropylether and on keeping at room temperature, 1-cinnamyl-4-(2-oxo-1-benzimidazolinyl)-piperidine is obtained; M.P. 163.5–165.5° C., pale-yellow, amorphous powder.

*Example II*

A mixture of 5 parts 4-chloro-1-phenyl-1-butene, 5.4 parts 4-(2-oxo-1-benzimidazolinyl)-piperidine, 6.4 parts sodium carbonate, a few crystals of potassium iodide in 200 parts hexone is stirred and refluxed for 40 hours. After cooling, 50 parts water are added. The $Na_2CO_3$ is dissolved and a precipitate is formed again; this is filtered off, to yield crude product. This crop is dissolved in 150 parts boiling chloroform. The solution is washed with water, dried over $K_2CO_3$, and evaporated. The solid residue is dissolved in a boiling mixture of 45 parts chloroform and 16 parts acetone. After cooling to −20° C., 1-(4-phenyl-3-butenyl) - 4 - (2-oxo-1-benzimidazolinyl)-piperidine is filtered off; M.P. 198–200.5° C.; pale-beige, amorphous powder.

*Example III*

To a solution of 290 parts cyclopropyl-4-fluoro-phenyl-carbinol in 800 parts anhydrous benzene are added portionwise 244 parts thionylchloride (temperature rises to about 50° C.). After the addition is complete, the whole is refluxed until no more gaseous hydrogen chloride is evolved (duration time about 3 hours). The reaction mixture is evaporated and the oily residue is distilled in vacuo, yielding 1 - (4-fluorophenyl)-4-chloro-1-butene; B.P. 130–132° C. at 12 mm. pressure.

To a stirred mixture of 4.4 parts 4-(2-oxo-1-benzimidazolinyl)-piperidine, 3.2 parts sodium carbonate, a few crystals of potassium iodide in 200 parts 4-methyl-2-pentanone are added 4.1 parts 1-(4-fluoro-phenyl)-4-chloro-1-butene. The whole is stirred and refluxed for 45 hours. After cooling, 70 parts water are added. The remaining precipitate is filtered off, washed successively with water, acetone and 4-methyl-2-pentanone and dried yielding crude 1-[4-(4-fluoro-phenyl)-3-butenyl]-4-(2-oxo-1-benzimidazolinyl)-piperidine. This crop is recrystallized from 120 parts 4-methyl-2-pentanone, yielding 1-[4-(4-fluoro-phenyl)-3-butenyl]-4-(2 - oxo-1-benzimidazolinyl)-piperidine; M.P. 186–187° C.

*Example IV*

While cooling 250 parts hydrobromic acid solution (60%) in an ice-bath, gaseous hydrobromic acid is introduced into it until saturation. Then there are added dropwise 81 parts 1-cyclopropyl-1-phenyl-ethanol, at a temperature of 0° C., and after the addition is complete the whole is stirred for another hour at the same temperature. The supernatant oily layer is separated, diluted with ether, washed with a saturated sodium hydrogen carbonate solution, dried over magnesium sulfate, filtered and evaporated. The oily residue is distilled in vacuo, yielding respectively a fraction of 2-phenyl-5-bromo-2-pentene; B.P. 145–155° C. at 19 mm. pressure and 2-phenyl-5-bromo-2-pentene; B.P. 155–163° C. at 22 mm. pressure.

To a mixture of 5 parts 4-(2-oxo-1-benzimidazolinyl)-piperidine, 3.2 parts sodium carbonate, a few crystals of potassium iodide in 200 parts 4-methyl-2-pentanone is added 4.4 parts 5-bromo-2-phenyl-2-pentene. After the addition is complete, the whole is stirred and refluxed for 65 hours. After cooling, 50 parts water are added. The reaction mixture is filtered from some insoluble matter. From the filtrate the organic layer is separated, dried over potassium carbonate, filtered and evaporated. The residue is boiled in a mixture of 120 parts acetone and 24 parts 2-propanol. To this hot solution is added a warm solution of 2.6 parts oxalic acid dihydrate in acetone. After cooling to room temperature, the solid oxalate is filtered off and recrystallized from 64 parts methanol, yielding 1-(4-phenyl-3-pentenyl) - 4-(2-oxo-1-benzimidazolinyl)-piperidine oxalate; M.P. 207.5–210° C.

*Example V*

250 parts hydrobromic solution (60%) are saturated with gaseous hydrobromic acid, while maintaining a temperature of 0° C. Then there are added dropwise 90 parts 1-cyclopropyl-1-(4-fluoro-phenyl) - ethanol (exothermic reaction). After the addition is complete, the whole is stirred for 1 hour at 0° C. The cooling-bath is removed. The oily layer is separated and diluted with 200 parts diethyl ether. The obtained mixture is washed with a sodium hydrogen carbonate solution in water, dried over magnesium sulfate, filtered and evaporated. The oily residue is distilled in vacuo, yielding 2-(4-fluoro-phenyl)-5-bromo-2-pentene; B.P. 133–136° C. at 10 mm. pressure; colourless liquid; $n_D^{20}$: 1.5500 and $d_{20}^{20}$: 1.3384.

A mixture of 5.4 parts 2-(4-fluoro-phenyl)-5-bromo-2-pentene, 4.4 parts 4-(2-oxo-1-benzimidazolinyl)-piperidine, 3.2 parts sodium carbonate, a few crystals of potassium iodide in 200 parts 4-methyl-2-pentanone is stirred and refluxed for 65 hours. After cooling the reaction mixture is decomposed with 70 parts water. The insoluble material is filtered off and discarded. From the filtrate, the organic layer is separated and evaporated. The oily residue is dissolved in 80 parts acetone. To this hot solution is added a solution of 2.6 parts oxalic acid dihydrate in acetone. After cooling to room temperature, the precipitated solid oxalate is filtered off and dried, yielding 1-[4-(4- fluoro-phenyl)-3-pentenyl]-4 - (2 - oxo - 1 - benzimidazolinyl)-piperidine oxalate; M.P. 203–204° C. (dec.).

Example VI

Starting from 20.6 parts magnesium and 120 parts methyliodide, a solution of methyl magnesium iodide is prepared in 160 parts anhydrous ether in the usual manner. To this solution is added a solution of 135 parts cyclopropyl-4-methoxyphenyl ketone in 120 parts anhydrous ether (exothermic reaction). After the addition is complete, the whole is stirred and refluxed for 3 hours. After cooling the reaction mixture is poured into icewater. To the mixture is added an ammonium chloride solution. The organic layer is separated and the aqueous layer is extracted once more with ether. The combined organic layers are dried over sodium sulfate and evaporated. The oily residue is distilled in vacuo, yielding dl-cyclopropyl-4-methoxyphenyl-methyl-carbinol; B.P. 143° C. at 3 mm. pressure; $n_D^{20}$: 1.5432; $d_{20}^{20}$: 1.0720.

To a solution of 57.5 parts dl-cyclopropyl-4-methoxyphenyl-methyl-carbinol in 80 parts benzene are added dropwise 40 parts thionyl chloride (exothermic reaction). After the addition is complete, the whole is stirred and refluxed for 1 hour. The reaction mixture is evaporated and the oily residue is distilled in vacuo, yielding 2-(4-methoxy-phenyl)-5-chloro-2-pentene; B.P. 141–143° C. at 2 mm. pressure; $n_D^{20}$: 1.5578; $d_{20}^{20}$: 1.1080.

A mixture of 3.7 parts 2-(4-methoxy-phenyl)-5-chloro-2-pentene, 3.5 parts 4-(2-oxo-1-benzimidazolinyl)- piperidine, 2.6 parts sodium carbonate, a few crystals of potassium iodide in 200 parts 4-methyl-2-pentanone is stirred and refluxed for 65 hours. After cooling, the reaction mixture is decomposed with 70 parts water. The organic layer is separated, dried over potassium carbonate, filtered and evaporated. The residue is dissolved in acetone and evaporated again. The solid residue is triturated in 80 parts acetone, boiled for a few minutes, cooled and filtered. After drying 1 - [4 - (4 - methoxy-phenyl) - 3 - pentenyl]-4-(2-oxo-1-benzimidazolinyl)-piperidine is obtained; M.P. 162–178° C.

Example VII

Starting from 11 parts magnesium, 69.7 parts methyl iodide in 160 parts anhydrous ether, a methyl magnesium iodide solution is prepared in the usual manner. To this solution is added a solution of 77 parts 4-chlorophenyl cyclopropylketone in 240 parts anhydrous ether, while stirring and refluxing. After the addition is complete, a solid is precipitated. The whole is stirred for two hours at room temperature, then decomposed with 800 parts of an ammoniumchloride solution 20% and the organic layer is separated, washed with water, dried over sodium sulfate, filtered and the filtrate is evaporated. The oily residue is distilled in vacuo, yielding dl-4-chlorophenyl-cyclopropyl-methyl-carbinol; B.P. 102–104° C. at 1 mm. pressure; $n_D^{20}$: 1.5485; $d_{20}^{20}$: 1.1498.

A mixture of 62 parts dl-4-chlorophenyl-cyclopropyl-methyl-carbinol and 80 parts benzene is cooled with icewater to a temperature below 15° C. Then there are added dropwise 40 parts thionyl chloride. After the addition is complete, the whole is stirred and refluxed for 1 hour. After cooling, the reaction mixture is evaporated. The residue is taken up in 160 parts benzene and the whole is evaporated again. This treatment is repeated once more to remove excess thionyl chloride. The remaining oily residue is distilled in vacuo, yielding 2-(4-chloro-phenyl)-5-chloro-2-pentene; B.P. 128–131° C. at 1.5 mm. pressure; $n_D^{20}$: 1.5696; $d_{20}^{20}$ 1.1694.

A mixture of 5 parts 2-(4-chloro-phenyl)-5-chloro-2-pentene, 5.1 parts 4-(2-oxo-1-benzimidazolinyl)-piperidine hydrochloride, 6.3 parts sodium carbonate, a few crystals of potassium iodide in 200 parts 4-methyl-2-pentanone is stirred and refluxed for 72 hours. After cooling the reaction mixture, 150 parts water are added. The undissolved part is filtered off, and extracted with chloroform. The combined organic layers (chloroform and 4-methyl-2-pentanone) are dried over sodium sulfate and evaporated. The solid residue is recrystallized from boiling 4-methyl-2-pentanone yielding 1-[4-(4-chlorophenyl)-3-pentenyl]-4 - (2-oxo-1-benzimidazolinyl)-piperidine; M.P. 217–218.5° C.

Example VIII

To a solution of 4-methyl-phenyl-magnesium bromide, prepared from 49 parts magnesium and 341 parts 4-methyl-bromobenzene in 400 parts dry tetrahydrofuran, is added dropwise a solution of 160 parts cyclopropyl methyl ketone in 560 parts anhydrous ether. After the addition is complete, the whole is stirred and refluxed for 1h. 30. After cooling, the reaction mixture is decomposed by successive addition of 50 parts ammonium chloride and 250 parts water, at a temperature below 20° C. The solution is decanted from some gelatinous precipitate and from the solution the etheric layer is separated and set aside. The gelatinous precipitate is triturated in ether and the solvent is decanted. This treatment is repeated twice. The combined organic layers are dried over potassium carbonate, filtered and evaporated. The residue is distilled in vacuo, yielding a first fraction of dl-cyclopropyl-methyl - 4 - methylphenyl-carbinol; B.P. 110–115° C. at 0.9–2 mm. pressure and a second fraction of di-cyclopropyl-methyl-4-methylphenyl-carbinol; B.P. 110–111° C. at 0.6–0.7 mm. pressure.

To a mixture of 248 parts dl-cyclopropyl-methyl-4-methylphenyl-carbinol and 480 parts anhydrous benzene are added dropwise 215 parts thionyl chloride (exothermic reaction). After the addition is complete, the whole is further stirred and refluxed for 2 hours. The reaction mixture is evaporated. The oily residue is extracted with benzene. This organic layer is dried over sodium sulfate, filtered and evaporated again. The oily residue is distilled in vacuo, yielding a first fraction of 2-(4-methyl-phenyl)-5-chloro-2-pentene; B.P. 102–110° C. at 0.7 mm. pressure; $n_D^{20}$: 1.5456; $d_{20}^{20}$: 1.0389; and a second fraction of 2-(4-methyl-phenyl)-5-chloro-2-pentene; B.P. 99–103° C. at 0.9 mm. pressure; $n_D^{20}$: 1.5500; $d_{20}^{20}$: 1.0407.

A mixture of 4.3 parts 2-(4-methyl-phenyl)-5-chloro-2-pentene, 5.1 parts 4-(2-oxo-1-benzimidazolinyl)-piperidine hydrochloride, 5.3 parts sodium carbonate, a few crystals of potassium iodide in 200 parts 4-methyl-2-pentanone is stirred and refluxed for 70 hours. After cooling, there are added 200 parts water. The organic layer is separated, dried over potassium carbonate, filtered and evaporated. The solid residue is boiled in 160 parts acetone. After cooling for 2 days at −20° C., the precipitated solid is filtered off, washed with acetone, and dried in vacuo, yielding 1-[4-(4-methyl-phenyl)-3-pentenyl]-4-(2-oxo-1-benzimidazolinyl)-piperdine; M.P. 190–194.5° C.

Example IX

A mixture of 10.95 parts 1-[4-(4-fluoro-phenyl)-3-butenyl]-4-(2-oxo-1-benzimidazolinyl)-piperidine, 40 parts formaldehyde and 200 parts 2-propanol is stirred and refluxed overnight. The reaction mixture is filtered hot and after cooling the filtrate to room tempreature, a solid is precipitated. It is filtered off and dried, to yield 1-[4-(4-fluoro-phenyl)-3-butenyl]-4-[3 - hydroxy-methyl)-2-oxo-1-benzimidazolinyl]-piperidine; M.P. 178–185° C.

Example X

A mixture of 3.8 parts 1-[4-(4-fluoro-phenyl)-3-pentenyl]-4-(2-oxo-1-benzimidazolinyl)-piperidine, 7.5 parts propionic acid anhydride and 80 parts anhydrous benzene is stirred and refluxed for 20 hours. After cooling, the reaction mixture is washed twice with 50 parts water. The whole is alkalized with ammonium hydroxide solution and then washed with water again. The organic layer is separated, dried over potassium carbonate. filtered and evaporated. The solid residue is recrystallized from 64 parts boiling acetone. After cooling to room temperature, the precipitated solid is filtered off and dried, to yield 1 - [4-(4-fluoro-phenyl-3-pentenyl]-4-(2-oxo-3-propionyl-1-benzimidazolinyl)-piperidine; M.P. 121–123° C.

*Example XI*

A mixture of 11.4 parts 1-[4-(4-fluoro-phenyl)-3-pentenyl]-4-(2-oxo-1-benzimidazolinyl)-piperidine, 40 parts formaldehyde and 200 parts 2-propanol is stirred and refluxed overnight. The reaction mixture is filtered hot and after cooling the filtrate to room temperature, the formed solids is filtered off and dried, to yield 1-[4-(4-fluoro-phenyl)-3-pentenyl] - 4 - [3-(hydroxy-methyl)-2-oxo-1-benzimidazolinyl]-piperidine; M.P. 176–178° C.

*Example XII*

To a warm solution (40° C.) of 3.65 parts 1-[4-(4-fluoro-phenyl) - 3 - butenyl] - 4 - (2-oxo-1-benzimidazolinyl)-piperidine and 0.4 part trimethylbenzylammoniumhydroxide in 40 parts dry tetrahydrofurane is added dropwise a solution of 3.1 parts acrylonitrile in 10 parts dry tetrahydrofurane, while stirring. After the addition is complete, the whole is stirred for 3h. 30 at a temperature of about 40–45° C. After cooling, the reaction mixture is filtered and the filtrate is evaporated. The oily residue is dissolved in 80 parts boiling 2-propanol. The solution is filtered hot and after cooling the filtrate to room temperature, the formed precipitate is filtered off and dried, to yield a first fraction of crude 1-[4-(4-fluoro-phenyl)-3-butenyl]-4-[3-(2 - cyano-ethyl)-2-oxo-1-benzimidazolinyl]-piperidine. On further keeping the mother liquor at room temperature, a second less pure fraction is filtered off. The combined fractions are recrystallized from 12 parts warm 2-propanol. After cooling to room temperature, the solid is filtered off and dried, yielding 1-[4-(4 - fluoro-phenyl)-3-butenyl]-4-[3 - (2 - cyano-ethyl) - 2 - oxo - 1 - benzimidazolinyl]-piperidine; M.P. 127–129.5° C.

*Example XIII*

A mixture of 3.65 parts 1-[4-(4-fluoro-phenyl)-3-butenyl]-4-(2-oxo-1-benzimidazolinyl)-piperidine, 7.5 parts propionic acid anhydride and 80 parts anhydrous benzene is stirred and refluxed for 20 hours. After cooling, the reaction mixture is washed twice with 50 parts water. The whole is alkalized with ammonium hydroxide solution. The organic layer is separated, dried over potassium carbonate, filtered and evaporated. The solid residue is recrystallized from 64 parts 4-methyl-2-pentanone at room temperature, to yield 1-[4-(4-fluoro-phenyl)-3-butenyl]-4-(2 - oxo-3-propionyl-1-benzimidazolinyl)-piperidine; M.P. 135–136° C.

*Example XIV*

A mixture of 3.8 parts 1-[4-(4-fluoro-phenyl)-3-pentenyl] - 4 - (2-oxo-1-benzimidazolinyl)-piperidine, 1.5 parts sodamide and 120 parts dry toluene is stirred and refluxed for 4 hours. To this hot mixture are added 2.17 parts N,N,N-trimethyl-anilinium bromide and the whole is stirred and refluxed for another 40 hours. After cooling the reaction mixture is filtered. The filtrate is washed with water. The aqueous layer is extracted with hydrochloric acid solution 18%, alkalized with sodium hydroxide solution and then extracted with chloroform. The organic layers are dried over sodium sulfate, filtered and evaporated. The oily residue is dissolved in 120 parts dry ether. This solution is filtered and then gaseous hydrogen chloride is introduced into the filtrate. The precipitated solid salt is filtered off and recrystallized from 80 parts acetone at room temperature, to yield 1-[4-(4-fluoro-phenyl) - 3 - pentenyl]-4-(3-methyl-2-oxo-1-benzimidazolinyl)-piperidine hydrochloride; M.P. 246–248.5° C.

*Example XV*

A mixture of 3.8 parts 1-[4-(4-fluoro-phenyl)-3-pentenyl]-4-(2-oxo-1-benzimidazolinyl)-piperidine, 6.12 parts acetic acid anhydride and 80 parts anhydrous benzene is stirred and refluxed overnight. After cooling the reaction mixture is washed twice with 50 parts water. This aqueous layer is alkalized with ammoniumhydroxide, washed once more with water and then the organic layer is separated. The latter is dried and evaporated. The oily residue is dissolved in acetone and this solution is evaporated again. The so obtained solid residue is recrystallized from 80 parts boiling diisopropylether, filtered off and dried, to yield 1 - [4 - (4-fluoro-phenyl)-3-pentenyl]-4-(3-acetyl-2-oxo-1-benzimidazolinyl)-piperidine; M.P. 116–117° C.

*Example XVI*

A mixture of 3.65 parts 1 - [4 - (4-fluoro-phenyl)-3-butenyl] - 4 - (2-oxo-1-benzimidazolinyl)-piperidine, 0.78 part sodamide and 120 parts dry toluene is stirred and refluxed with a stoichiometric excess of benzoyl chloride for 16 hours. After cooling there are added 100 parts water. The organic layer is separated, dried over sodium sulfate, filtered and evaporated. The oily residue is dissolved in 200 parts anhydrous ether. This solution is filtered and then gaseous hydrogen chloride is introduced into the filtrate: a dark coloured sticky precipitate is obtained. The solvent is decanted and the residue is dissolved in boiling 2-propanol. After cooling, the precipitated solid is filtered off and dried, yielding 1-[4-(4-fluoro - phenyl) - 3 - butenyl] - 4 - (3 - benzoyl - 2 - oxo-1-benzimidazolinyl)-piperidine hydrochloride; M.P. 244–245.5° C.

*Example XVII*

A mixture of 3.65 parts 1-[4-(4-fluoro-phenyl)-3-butenyl] - 4 - (2-oxo-1-benzimidazolinyl)-piperidine, 1.5 parts sodamide and 120 parts dry toluene is stirred and refluxed for 4 hours. To this hot mixture are added dropwise 2.17 parts N,N,N-trimethyl-aniliniumbromide and the whole is further stirred and refluxed for another 40 hours. After cooling, the reaction mixture is filtered. The filtrate is washed with water, extracted with hydrochloric acid solution 18%, alkalized with sodium hydroxide and extracted with chloroform. The organic layers are dried over sodium sulfate, filtered and evaporated. The oily residue is dissolved in 80 parts diisopropylether. This solution is filtered and then gaseous hydrogen chloride is introduced into the filtrate. The solid salt is filtered off and recrystallized from boiling acetone. After cooling the solid is filtered off and dried overnight in vacuo yielding 1-[4-(4-fluoro-phenyl)-3-butenyl]-4-(3-methyl-2-oxo-1-benzimidazolinyl)-piperidine hydrochloride; M.P. 250–254° C.

*Example XVIII*

While cooling 40 parts thionylchloride in an ice-bath, there are added dropwise 8.5 parts 1-[4-(4-fluoro-phenyl)-3 - butenyl] - 4 - [3 - (hydroxy-methyl)-2-oxo-1-benzimidazolinyl]-piperidine while stirring. After the addition is complete, the cooling-bath is removed and the whole is first stirred for 2 hours at room temperature and further for 6 hours in an ice-bath. The cooling-bath is removed again and there are added 40 parts diisopropylether and the mixture is stirred overnight at room temperature. The precipitated solid is filtered off and boiled in 160 parts acetone. After cooling, the solid is filtered off, washed on the filter with acetone and dried, yielding 1 - [4-(4-fluoro-phenyl)-3-butenyl]-4-[3-(chloro-methyl)-2-oxo-1-benzimidazolinyl]-piperidine hydrochloride; M.P. 272–281° C. (dec.).

*Example XIX*

A mixture of 3.8 parts 1-[4-(4-fluoro-phenyl)-3-pentenyl]-4-(2-oxo-1-benzimidazolinyl)-piperidine, 0.4 part benzyltrimethylammoniumhydroxide and 30 parts dry tetrahydrofuran is heated to 40° C., while stirring. While ther stirred for 3h. 30 at a temperature of 40–45° C. The reaction mixture is filtered and evaporated. The dark-coloured oily residue is dissolved in 80 parts boiling 2-propanol. After cooling to room temperature, the precipitated solid is filtered off and dried, to yield 1-[4-(4-fluoro - phenyl) - 3-pentenyl]-4-[3-(2-cyanoethyl)-2-oxo-1-benzimidazolinyl]-piperidine; M.P. 97–101° C.

*Example XX*

A sodium methoxide solution, prepared in the usual manner starting from 0.92 part sodium in 40 parts methanol is added dropwise to a solution of 2.2 parts 1 - [4-(4-fluoro-phenyl)-3-butenyl]-4-[3-(chloro-methyl)-2-oxo-1-benzimidazolinyl]-piperidine hydrochloride in 40 parts methanol, while stirring and refluxing. After the addition is complete, the whole is further stirred and refluxed for another 6 hours. The reaction mixture is cooled and evaporated. The solid residue is washed with water and extracted with chloroform. The organic layer is separated, dried over sodium sulfate, filtered and evaporated. The oily residue solidifies on evaporation in methanol. The solid is recrystallized from 80 parts methanol, to yield 1 - [4-(4-fluoro-phenyl)-3-butenyl]-4-[3-(methoxy - methyl) - 2 - oxo-1-benzimidazolinyl]-piperidine; M.P. 120.5–127° C. (dec.).

*Example XXI*

Interaction of 1-[4-(4-fluoro-phenyl)-3-butenyl]-4-[3-(chloromethyl) - 2 - oxo - 1-benzimidazolinyl]-piperidine with potassium cyanide in aqueous ethanol yields 1-[4-(4 - fluoro-phenyl)-3-butenyl]-4-[3-(cyanomethyl)-2-oxo-1-benzimidazolinyl]-piperidine.

What is claimed is:
1. Chemical compounds selected from the group consisting of
maintaining this temperature there are slowly added 2.5 parts acrylonitrile dissolved in 10 parts dry tetrahydrofuran. After the addition is complete, the whole is fur-

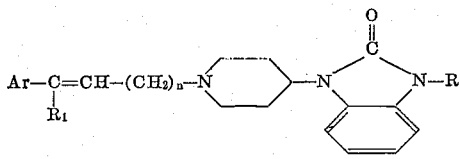

and the therapeutically active non-toxic acid addition salts thereof wherein Ar is a member selected from the group consisting of phenyl, halophenyl, lower alkylphenyl and lower alkoxyphenyl; R is a member selected from the group consisting of hydrogen, lower alkyl, lower alkylcarbonyl, benzoyl, hydroxymethyl, halomethyl, lower alkoxymethyl, cyanomethyl and cyano—$CH(R_2)CH(R_2)$— said $R_2$ being a member selected from the group consisting of hydrogen and methyl; $R_1$ is a member selected from the group consisting of hydrogen and methyl; and $n$ is an integer from 1 to 2.

2. The compounds of claim 1 wherein said Ar is fluorophenyl.
3. 1 - [4 - (4 - fluoro-phenyl)-3-pentenyl]-4-(2-oxo-1-benzimidazolinyl)-piperidine oxalate.
4. 1 - [4 - (4-fluorophenyl)-3-pentenyl]-4-[3-hydroxymethyl)-2-oxo-1-benzimidazolinyl]-piperidine.
5. 1 - [4 - (4-fluoro-phenyl) - 3 - butentyl]-4-(2-oxo-1-benzimidazolinyl)-piperidine.
6. 1 - [4 - (4-fluoro-phenyl)-3-pentenyl]-4-(3-acetyl-2-oxo-1-benzimidazolinyl)-piperidine.
7. 1 - [4 - (4-fluoro-phenyl)-3-butenyl]-4-[3-(hydroxymethyl)-2-oxo-1-benzimidazolinyl]-piperidine.

References Cited

UNITED STATES PATENTS 3,238,216  3/1966  Janssen _____ 260—294

WALTER A. MODANCE, *Primary Examiner.*
A. O. SPEVACK, *Assistant Examiner.*

UNITED STATES PATENT OFFICE
CERTIFICATE OF CORRECTION

Patent No. 3,345,364                  October 3, 1967

Paul Adriaan Jan Janssen

It is hereby certified that error appears in the above numbered patent requiring correction and that the said Letters Patent should read as corrected below.

Column 1, lines 67 and 68, for

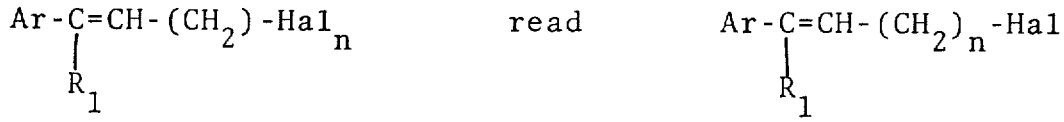

column 2, line 2, for "pesence" read -- presence --; column 6, line 63, before "hydroxy" insert a parenthesis; column 7, line 3, after "-phenyl" insert a parenthesis; column 10, lines 25 and 31, before "hydroxy-", each occurrence, insert a parenthesis.

Signed and sealed this 19th day of November 1968.

(SEAL)
Attest:

EDWARD M. FLETCHER, JR.            EDWARD J. BRENNER
Attesting Officer                  Commissioner of Patents